Dec. 4, 1962 — W. E. MEISSNER ET AL — 3,066,461
APPARATUS FOR MAKING STUFFED PRODUCTS
Filed May 23, 1957 — 2 Sheets-Sheet 1

3,066,461
APPARATUS FOR MAKING STUFFED PRODUCTS

William E. Meissner, Devon, Pa., Lester B. Cundiff, Wilmington, Del., and Melvin K. Barrall, Media, Pa., assignors to American Viscose Corporation, Philadelphia, Pa., a corporation of Delaware
Filed May 23, 1957, Ser. No. 661,055
8 Claims. (Cl. 53—177)

This invention relates, in general, to making stuffed products, and particularly to an apparatus wherein continuous casings of indefinite length are concomitantly formed and filled with a stuffing material.

As heretofore disclosed, continuous casings are in general formed by passing a continuous flexible sheet material or film through a folder mechanism which deflects the same into an embracing relationship about an elongated stuffing nozzle, through which a plastic stuffing material is forced under pressure. During its movement through the folder mechanism, the longitudinal edges of the sheet material are disposed in overlapping relationship, in which position they are bonded to each other, as for example by heat or a liquid adhesive, to form a finished casing into which the stuffing material is delivered under pressure.

In many of these known stuffing procedures, the pressure of the stuffing material causes or assists in drawing the sheet material or film through the folder mechanism and its associated sealing device. Under these operating procedures, every effort is made to minimize tension on the sheet material to insure proper delivery of the finished casing and to avoid rupture of the casing as the stuffing material is forced therein. It has been found, however, that the success of the stuffing operation, in accordance with the known practices, depends to a great extent upon the condition of the sheet material employed, with extreme care being exercised to avoid films having wrinkles, folds or curled edges.

In the production of stuffed products, one aim has long been to produce a firm and tightly encased article. This ultimate goal has not, however, been heretofore attained with full satisfaction, since the sheet materials or films most suitable for stuffing operations tend to absorb moisture from the plastic stuffing material. When moistened, the casing expands slightly, providing an end product which is undesirably soft and limp.

In view of the above noted disadvantages of the conventional stuffing practices, and others which will become apparent hereafter, it is a primary object of the present invention to provide a generally improved and more satisfactory apparatus for use in the continuous production of the stuffed products.

Another object of the invention is to provide an improved apparatus for use in the continuous production of stuffed products having tight-fitting casings which are stuffed concomitantly with their formation.

Still another object of the invention is to provide an apparatus wherein a continuous casing for stuffed products is formed from a flexible sheet material or film which is folded and sealed into a tubular form while being maintained under tension.

A further object of the invention is the provision of an apparatus for use in making stuffed products wherein a continuous flexible sheet material or film is folded into an elongated tubular form, reliably bonded in a minimum of time to provide an integral casing, and humidified to a desirable degree before being filled with a stuffing material.

A still further object of the invention is to provide a sanitary apparatus for use in making stuffed products which facilitates the stuffing of an elongated casing without any back flowing of the stuffing material along the exterior surface of the stuffing nozzle itself.

These and other objects and advantages of the invention will be apparent from the following description and accompanying drawing in which:

FIGURE 6 is a fragmentary view showing the discharge end of the stuffing machine nozzle; and FIGURE 7 is a perspective view illustrating a detail portion of the belt take-off mechanism employed in withdrawing the stuffed product from the stuffing apparatus itself.

Figure 1:
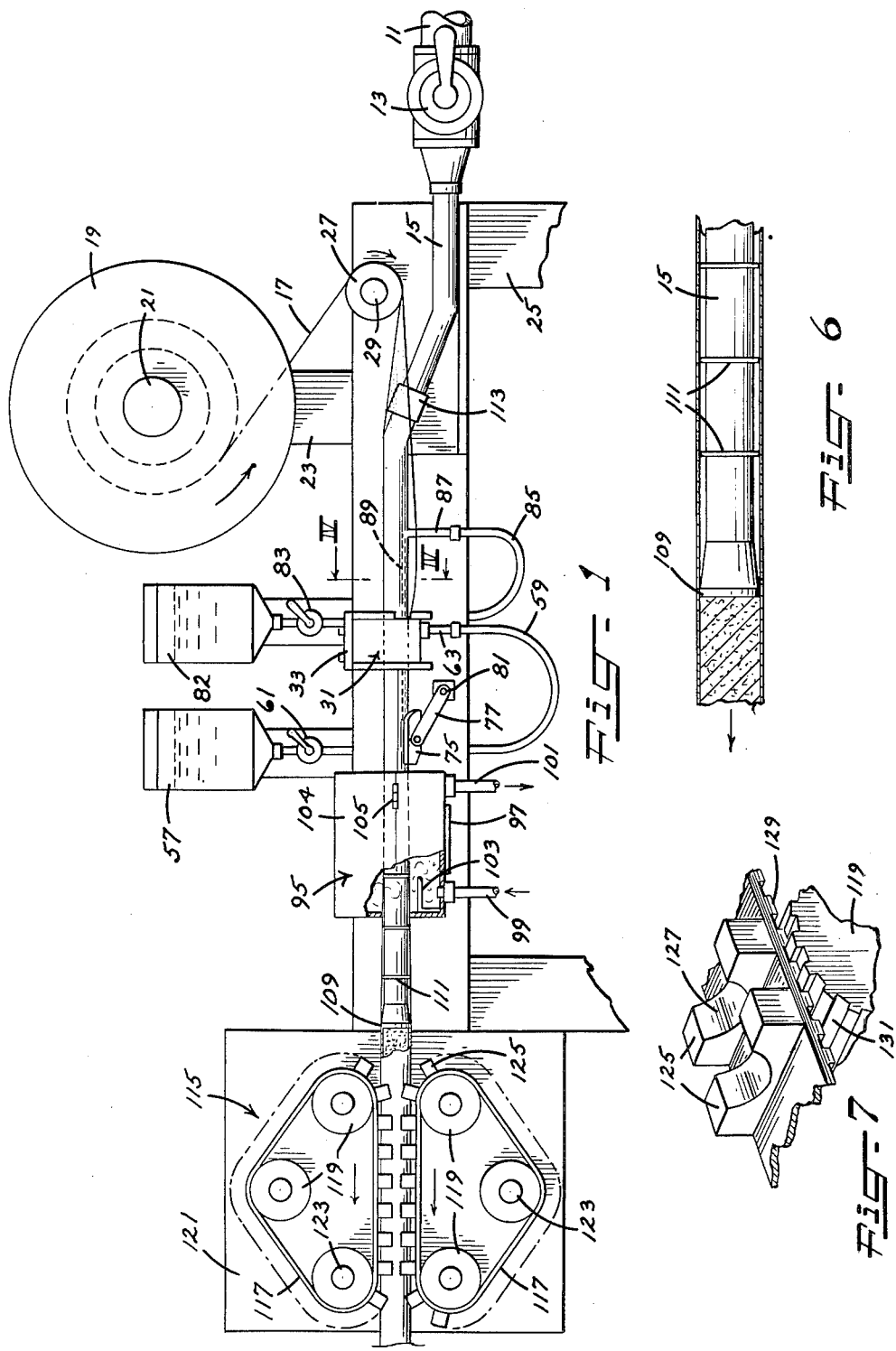
FIGURE 1 is a side elevation of the apparatus of the present invention, with parts thereof being broken away.

In general, the objects of the present invention are accomplished by providing a continuous casing forming and stuffing apparatus comprising, in combination, a plastic stuffing material supply, a feed line or nozzle through which the plastic material is continuously forced under pressure and extruded from the discharge terminus thereof, means for continuously shaping or folding a flexible sheet material or film into a tubular form about the stuffing nozzle, means for supplying an adhesive material to one of the edges of the film just prior to its overlapping, presser means for sealing the film edges as they travel over the nozzle, means for continuously applying a neutralizing agent to the inner side of the seam as it is being formed, means for humidifying the finished casing prior to stuffing of the same, means adjacent to the discharge terminus of the stuffing nozzle for minimizing contact between the finished casing and the nozzle and for preventing back flow of stuffing material around the nozzle, and means for withdrawing the stuffed product away from the stuffing machine itself.

One of the characteristic features of the present invention is that a continuous casing is stuffed under pressure and while in a humidified or moist condition so as to produce a firm and tightly-encased stuffed product. Another feature is that the sheet material or film is under tension as it is folded into a casing form to insure that all wrinkles, folds, or edge curls are removed therefrom. In line with these important aspects of the invention, the terminal portion of the stuffing nozzle is provided with corrugations or projections which serve to minimize frictional contact between the casing and the nozzle, and that the discharge end of the nozzle is flared outwardly so as to prevent an unsanitary and movement-retarding accumulation of stuffing material between the nozzle and casing walls.

The seamed artificial casing of the present invention is formed by folding about the stuffing nozzle a flexible sheet or film of alkali sensitive material, such as regenerated cellulose, cellulose acetate and the like, or preferably, an alkali-soluble, water-insoluble cellulose material, such as a lower alkyl, hydroxyalkyl, or carboxyalkyl ether of cellulose, preferred specific materials being ethyl, methyl, hydroxyethyl, and carboxymethyl ethers of cellulose, mixed cellulose ethers of this class, and also sheets derived from cellulose ether-xanthate, cellulose xanthoethers, cellulose thiourethanes and cellulose xantho fatty acids.

As a suitable adhesive for use in sealing the overlapped edges of the sheet material or film in forming the casing, there may be provided any alkaline liquid, such as a dilute solution of caustic soda or potash. If desired, the adhesive may be an alkaline solution of one of the alkali-soluble cellulosic materials of which the casing may be made and the cellulosic material in the adhesive may be the same as or different than that of the sheet or film. If desired, a coating of the alkali-adhesive material may be applied adjacent to one edge of the sheet material and dried before the sheet material is wound up into a roll or before it is passed into the casing-forming mechanism. In this latter case, it is merely necessary to wet the coated edge of the sheet material as it proceeds to the casing-forming position before the edges are overlapped. Preferably however, the adhesive material is applied to one edge of the sheet just before the sheet is formed into a casing.

As more fully described hereafter, once the adhesive has been applied to the edge of the film and the edges are overlapped, they are preferably subjected to pressure as they proceed along the stuffing nozzle to assure good adhesion. With certain products, as for example foodstuffs, it is desirable to neutralize the alkali before the material is stuffed into the casing. This is accomplished by applying an acid liquid, such as acetic acid or the like, to the inside surface of the seam before the sealed casing leaves the terminus of the tube.

Referring now to the drawing which depicts illustrative embodiments of the invention, and in particular to FIGURE 1, the plastic stuffing material, as for example sausage meat, is forced under air pressure from a suitable storage tank, not shown, through a conduit 11 and valve 13 into an elongated feed line or stuffing nozzle 15. A roll of flexible sheet material or film 17, for use in forming the casing which is carried by a reel 19, preferably flanged and rotatably supported on a shaft 21. The shaft 21 projects from an arm 23 which in turn is supported by the machine frame, indicated generally at 25. The sheet material 17 passes under an idler roll 27 rotatably carried by a shaft 29, which is suitably mounted on the machine frame 25, and then travels to a folder mechanism or casing former shown at 31.

Figure 2:
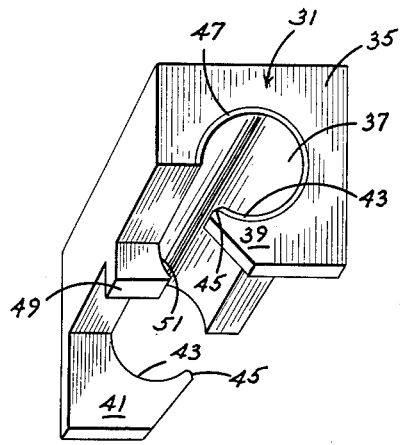
FIGURE 2 is a perspective view of the sheet material of film folder mechanism.

The former 31 is fixed to the machine frame 25 by a bracket 33 and, as best seen in FIGURE 2, includes a main body portion 35, having a substantially semi-cylindrical slot 37, and end flanges 39 and 41 which project downwardly from a main body portion 35. The flanges 39 and 41 are each provided with an arcuate surface 43 having the same radius of curvature as the surface of the arcuate slot 37. It will be further noted that the flanges 39 and 41 are formed with smooth rounded edges at 45 so as to permit the desired deflection of the sheet material into a tube form without damage, and that the entrance end of the former is beveled at 47 for ease in lacing the sheet material at the start of the stuffing operation. Intermediate the end flanges 39 and 41, and on the same side of the flange 41, the former 31 is provided with a projection 49, also having an arcuate surface 51 which corresponds to that of the slot 37.

Figure 3:
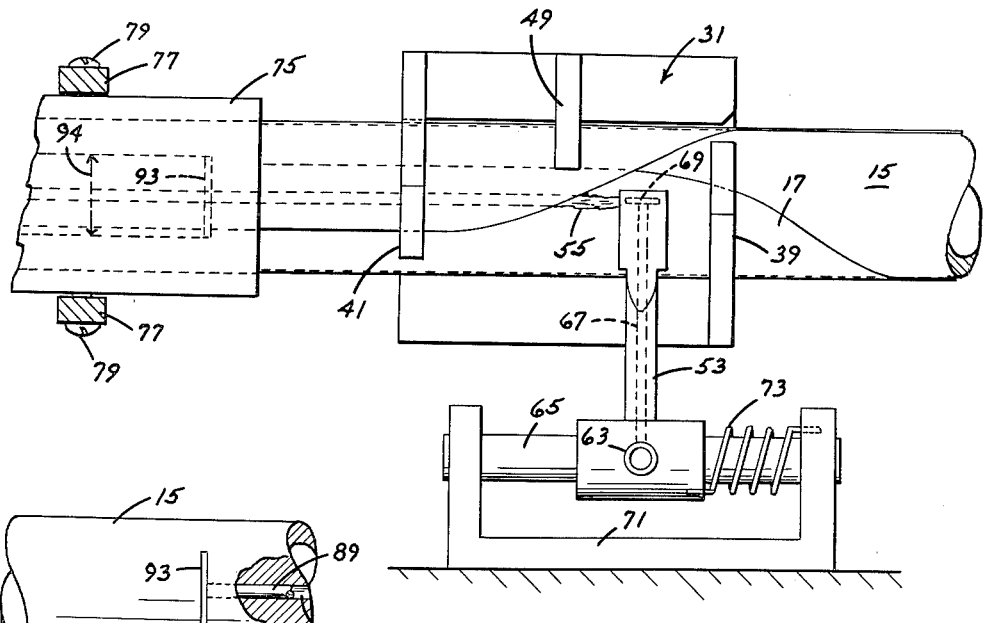
FIGURE 3 is a bottom view of a portion of the stuffing machine nozzle illustrating the folder mechanism and the adhesive applicator in use.

As best seen in FIGURES 1 and 3, the stuffing nozzle 15 extends through the folder mechanism 31, with sufficient clearance between these parts to allow the passage of the sheet material therebetween. Upon entry of the sheet material 17 into the former device 31, the end flange 39 gradually urges one longitudinal edge of the sheet material downwardly and inwardly into embracing relationship about the stuffing nozzle 15, as seen in FIGURE 3. In this position, the folded longitudinal edge of the sheet material rides between the stuffing nozzle 15 and an arm 53 which, as more fully described hereafter, applies a narrow strip of liquid adhesive as shown at 55. With continued travel through the former device 31, the opposite longitudinal edge of the sheet material 17 is initially deflected toward the stuffing nozzle 15 as it rides over the arcuate surface 51 of the projection 49, and is finally disposed in overlapping relationship with the first mentioned longitudinal edge of the sheet material by the end flange 41, where it is ultimately sealed to form a finished casing. It will be here noted that the folding of the sheet material 17 into its casing form does not in any manner intefere with the adhesive application, and that the end flanges 39 and 41 and the projection 49 perform their sheet material folding operations without at any time contacting the applied adhesive.

Figure 4:
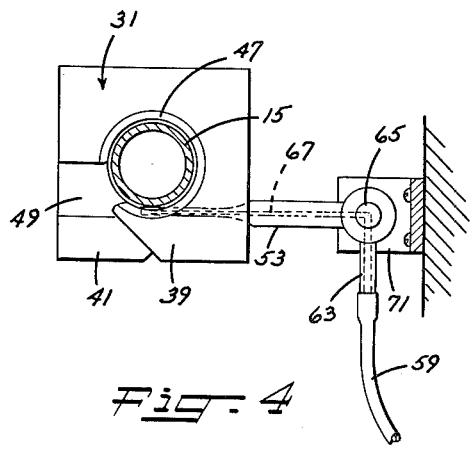
FIGURE 4 is a transverse vertical section taken along the line IV—IV of FIGURE 1.

The adhesive material is stored in a tank 57 and is fed by gravity, or a pump if desired, through a flexible conduit or pipe 59 which may be made from any alkali resistant material, such as a modified halide polymer, condensation resin, or diene derivative commercially available under the trademark of Tygon. A valve 61 is positioned in the supply line to regulate the adhesive delivery. As shown in FIGURES 3 and 4, the adhesive supply conduit 59 is connected to a stem 63 of a rocker shaft 65, to which is also fixed, the adhesive applicator arm 53. A continuous passage 67 extends through the stem 63, rocker shaft 65, and the adhesive applicator arm 53 and opens into an elongated slot 69 through which the adhesive material is finally discharged onto the sheet material along a line substantially parallel to the axis of the stuffing nozzle 15. The rocker shaft 65 is pivotally supported by a machine frame bracket 71 and is constantly urged in a clockwise direction, as viewed in FIGURE 4, by a spring 73 to maintain the adhesive discharge slot 69 snugly up against the longitudinal edge portion of the sheet material 17 initially folded about the stuffing nozzle.

Upon leaving the folder device 31, the overlapped sheet material edge portions ride between a presser shoe 75 and the stuffing nozzle 15 to insure a satisfactory bond therebetween. The presser shoe 75 is provided with an upper arcuate face corresponding to that of the stuffing nozzle periphery, and is preferably formed of tetrafluoroethylene polymer known as Teflon which permits the casing seam to be subjected to pressure without causing excessive frictional drag on the same. A pair of support arms 77 are connected at 79 to the presser shoe 75 and are pivotally mounted on a shaft 81 projecting from the machine frame. Resilient means, such as a spring not shown, normally urges the arms 77 in a clockwise direction as viewed in FIGURE 1 to maintain the arcuate surface of the presser shoe 75 in snug bearing relationship with the casing seam and the bottom peripheral portion of the stuffing nozzle 15. As apparent from FIGURE 3, one of the important characteristics of the presser shoe 75 is the relatively wide contact that its arcuate surface makes with the casing material. In view of this relationship, there is good assurance that a proper bond will be attained at the overlapped edges of the sheet material even though the casing seam may tend to weave from its desired path.

When the adhesive material employed in forming the casing contains a strong alkali, it is desirable in many cases to neutralize the excess alkali present on the casing seam to guard against any possible injurious effects in the finished product. For this purpose the internal surface of the seam is brought into contact with an aqueous solution of an acid, which when reacted with an alkali, such as sodium hydroxide, will form a non-injurious salt therewith. It is preferred to employ an aqueous solution of acetic acid, but any other similar acid may be employed if desired such as citric, tartaric, etc.

Figure 5:
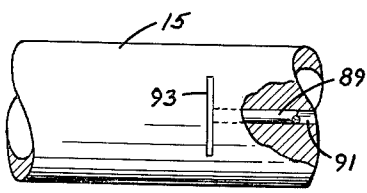
FIGURE 5 is a fragmentary portion of the stuffing machine nozzle illustrating means for applying a neutralizing agent to a previously bonded casing seam.

With reference to FIGURES 1, 3, and 5, this neutralizing action is accomplished while the casing travels between the presser shoe 75 and the stuffing nozzle 15. The aqueous acid solution is stored in a tank 82 and flows therefrom through a valve 83 and a conduit 85, the latter of which is in turn connected to an entrance stem 87 of a small bore pipe 89. To retain the smooth configuration of the nozzle passage, the pipe 89 is preferably seated within a grooved portion 91 in the nozzle wall, as best seen in FIGURE 5. The pipe 89, as shown in FIGURES 3 and 5, is in fluid conducting relationship with an elongated transverse slot 93 which is open to the periphery of the stuffing nozzle 15, and is disposed directly above the presser shoe 75. The conduit or capillary tube 85 may be also formed of Tygon or other chemically inert and flexible material. In delivering the neutralizing acid to the internal surface of that portion of the casing seam which is pressed between the shoe 75 and the stuffing nozzle 15, it is evident that the neutralizer acid will have no tendency to assume a droplet form, but will be uniformly spread by a squeezing action along a relatively wide area of the casing seam as shown at 94. This, of course, insures complete and proper neutralization of any adhesive solution which may have entered into the casing during its formation.

The now formed casing is passed through a stream or humidifying chamber 95 supported by the machine frame 25 through a bracket shown at 97. The chamber 95 is continuously supplied with a hot and humid atmosphere by circulating steam through pipes 99 and 101, with a deflector 103 being interposed adjacent the steam inlet pipe 99 to prevent direct impingement of the steam against the finished casing. In order that the initial lacing of the sheet material 17 may be accomplished with ease, and to permit any necessary repairs to the humidifying chamber 95, the upper portion or hood 104 of the chamber is swingably hinged along one side, as shown at 105. As heretofore explained, casing humidification prior to stuffing satisfactorily moistens the same and removes any tendency for the casing to absorb moisture from the stuffing material itself once the casing is stuffed. In addition, the moisture imparted to the casing renders the same more flexible, and thus the humidification procedure offers complete assurance that the resulting stuffed product will not become undesirably soft and limp, and permits the same to more easily bend without risk of causing rupture.

Stuffing of the casing is accomplished as the casing leaves the discharge end of the nozzle 15 which, as shown in FIGURE 6, is flared outwardly at 109 into a close fitting relationship with the internal wall of the casing. Flaring of the stuffing nozzle 15, as described, prevents the plastic stuffing material from flowing back over the end of the stuffing nozzle, as has been encountered with stuffing machines of conventional design. Accordingly, by preventing any accumulation of stuffing material between the stuffing nozzle and the casing, this construction removes one source of frictional drag on the casing, in addition to providing more sanitary stuffing conditions. To further minimize the frictional drag on the casing as it travels from the presser shoe 75 to the discharge or flared end of the stuffing nozzle 15, projections or corrugations 111 are provided on the external periphery of the nozzle 15. These projections serve as casing spacers, and may be in forms other than that illustrated, such as dimples, longitudinal ribs spaced circumferentially of the nozzle 15, or diagonally disposed rings. To assure proper stuffing pressure, the portion of the stuffing nozzle intermediate the valve 13 and a nozzle coupling 113 is preferably formed with an enlarged inside diameter to compensate for any pressure drop on the stuffing material during its passage through the stuffing nozzle.

As the stuffed product leaves the discharge end of the nozzle 15, it is under a positive pulling force exerted by a take-off mechanism indicated generally at 115. It will be noted that reliance is not placed upon the pressure of the stuffing material as the main driving force. As heretofore mentioned, this positive withdrawal action of the stuffed product permits the sheet material to be tensioned during the casing formation so that any wrinkles, folds, or edge curls in the sheet material are removed rather than being incorporated into the finished casing. This aspect of the present invention permits consistently reliable results to be attained, and in effect makes the stuffing operation less sensitive to the condition of the particular sheet material or film being employed.

As best seen in FIGURES 1 and 7, the take-off mechanism 115 includes a pair of endless belts 117, each of which is trained over wheels 119 rotatably mounted on a support plate 121 by shafts 123. An air motor, not shown, drives at least one wheel of each of the belt systems illustrated. To facilitate the gripping of the stuffed product along a substantial portion of its periphery, a series of spaced blocks 125, preferably formed of rubber, are affixed to the exterior surface of each belt, and are each provided with an arcuate surface 127 corresponding to the shape of the stuffed product. In addition to the large area of the stuffed product gripped by each of the blocks 125, it will be noted that a series of blocks 125 of each of the belts 117 simultaneously act upon the stuffed product. In this manner, the pulling force is distributed over a large area of the finished product. Synchronous movement of the belts 117 at the proper speed is attained by providing each belt and at least one wheel 119 of each series of wheels with cooperating lugs and peripheral grooves 129 and 131, respectively (see FIGURE 7). After leaving the take-off device 115, the stuffed product may be collected or passed directly to other treating apparatus.

In practicing the stuffing method with the apparatus described, air under pressure is first introduced into the stuffing material storage tank with the valve 13 closed. Valves 61 and 83 are opened to allow the adhesive and neutralizer to flow into their respective delivery conduits 59 and 85. The sheet material 17 is initially laced about the idler roll 27 and through the folder mechanism 31, between the presser shoe 75 and the stuffing nozzle 15, and finally through the humidifying chamber 95. The operator manually draws the leading end of the sheet material until a properly sealed casing is formed. Steam is then circulated through the humidifying chamber 95 and the take-off mechanism 115 is started. The valve 13 is then opened allowing the stuffing material to move through the nozzle and issue from its flared end 109. This stuffed product is then manually threaded between the opposing blocks 125 of the endless belts 117, with the take-off mechanism 115 in operation. After these preliminary steps have been taken, the machine operates automatically and requires only periodic attention by the operator.

It will be understood that the apparatus of the present invention can be employed for producing stuffed products of various types, such as ice cream, fats, scrapple and other meat products, as well as cheese, lard, oleomargarine, greases, snuff, caulking compound, and other products normally stuffed into casings, and in the appended claims, the expression "stuffed products" is intended to include all such products.

It is seen from the above description that the castings formed by the apparatus of the present invention are always of uniform diameter both before and after the stuffing operation. Further, since the film or sheet material is maintained under tension during the casing formation, there is little danger that the casing will be improperly formed with wrinkles or folds incorporated therein. In view of the casing humidification prior to actual stuffing, the end stuffed product will, at all times, retain its firm and tightly encased characteristics. It will be further apparent from the above description, that the method and apparatus set forth herein are highly adapted for use in packaging food products, and can well satisfy the normally strict sanitation requirements.

It is to be understood that the foregoing description is merely illustrative and that changes and variations may be made without departing from the spirit and scope of the invention as defined in the appended claims.

We claim:

1. Apparatus for producing continuous stuffed products including a stuffing nozzle, means for conveying a plastic stuffing material to one end of said nozzle, means for shaping a continuous strip of sheet material into a casing about said nozzle, said last mentioned means including a body member extending along said nozzle in spaced relationship therewith, a first flange at one end of said body member extending partially about said nozzle in spaced relationship therewith and serving to deflect one longitudinal edge of the sheet material about the nozzle, a second flange at the opposite end of said body member extending about said nozzle in spaced relationship therewith and serving to deflect the other longitudinal edge of the said material about said nozzle and into overlapping position with the first mentioned longitudinal edge, and a projection carried by said body member between said first and second flanges for imparting an initial deflection to said other longitudinal edge as the sheet material approaches said second flange, means for sealing the longitudinal edges of the sheet material to form a longitudinal seam on the casing, the other end of said nozzle serving as a discharge orifice through which the plastic stuffing material is delivered into the casing, means directly adjacent to and spaced longitudinally away from said nozzle discharge orifice for engaging with the stuffed product and drawing the same therefrom, said last-mentioned means serving to maintain said sheet material under tension during said casing formation, said nozzle being flared outwardly adjacent said discharge orifice to engage with the internal wall of the casing and prevent flow of plastic stuffing material back along the nozzle periphery, and means on a portion of the nozzle periphery immediately adjacent to the flared discharge orifice for maintaining the casing spaced from the nozzle surface.

2. In an apparatus for producing continuous stuffed products including a stuffing nozzle, means for conveying a plastic stuffing material to one end of said nozzle, means for shaping a continuous strip of sheet material into a casing about said nozzle, said last-mentioned means including a body member extending along said nozzle in spaced relationship therewith, a first flange at one end of said body member extending partially about said nozzle in spaced relationship therewith and serving to deflect one longitudinal edge of the sheet material about the nozzle, a second flange at the opposite end of said body member extending about said nozzle in spaced relationship therewith and serving to deflect the other longitudinal edge of the sheet material about said nozzle and into overlapping position with the first-mentioned longitudinal edge, and a projection carried by said body member between said first and second flanges for imparting an initial deflection to said other longitudinal edge as the sheet material approaches said second flange.

3. Apparatus as defined in claim 2 further including means for applying an adhesive to said one longitudinal edge of the sheet material as it travels between said first flange and said projection.

4. In an apparatus for producing continuous stuffed products including a stuffing nozzle, means for conveying a plastic stuffing material into one end of said nozzle, means for shaping a continuous strip of sheet material into a casing about said nozzle, said last mentioned means including a body member extending along said nozzle in spaced relationship therewith, a first flange at one end of said body member extending partially about said nozzle in spaced relationship therewith and serving to deflect one longitudinal edge of the sheet material about the nozzle, a second flange at the opposite end of said body member extending about said nozzle in spaced relationship therewith and serving to deflect the other longitudinal edge of the sheet material about said nozzle and into overlapping position with the first mentioned longitudinal edge, and a projection carried by said body member between said first and second flanges for imparting an initial deflection to said other longitudinal edge as the sheet material approaches said second flange, means for sealing the longitudinal edges of the sheet material to form a longitudinal seam on the casing, said last-mentioned means including a shoe positioned adjacent to said nozzle, said shoe adapted to overlie the longitudinal edges of the sheet material as the same travels away from said shaping means, said shoe having an arcuate face for snugly pressing said longitudinal edges of the sheet material against the nozzle periphery to provide said seam, and a conduit extending along the wall of said nozzle for applying a liquid to the inner surfaces of the longitudinal edges of the sheet material, said conduit terminating opposite said shoe to effect said liquid application while the longitudinal edges of the sheet material are under pressure.

5. Apparatus for producing continuous stuffed products including a stuffing nozzle, means for conveying a plastic stuffing material to one end of said stuffing nozzle, means for shaping a continuous strip of sheet material into a casing about said nozzle, said last mentioned means including a body member extending along said nozzle in spaced relationship therewith, a first flange at one end of said body member extending partially about said nozzle in spaced relationship therewith and serving to deflect one longitudinal edge of the sheet material about the nozzle, a second flange at the opposite end of said body member extending about said nozzle in spaced relationship therewith and serving to deflect the other longitudinal edge of the sheet material about said nozzle and into overlapping position with the first mentioned longitudinal edge, and a projection carried by said body member between said first and second flanges for imparting an initial deflection to said other longitudinal edge as the sheet material approaches said second flange, means for applying an adhesive to one longitudinal edge of the sheet material during the shaping of the same into a casing, means for sealing the longitudinal edges of the sheet material in overlapping relationship to form a longitudinal seam on the casing, said last-mentioned means including a shoe for pressing the overlapped edges of the sheet material against the nozzle periphery, the opposite end of the said nozzle serving as a discharge orifice and being flared outwardly into engagement with the internal wall of the casing, means for subjecting the formed casing to a hot and humid atmosphere as it approaches said discharge orifice, projections on the nozzle periphery adjacent its discharge orifice for maintaining the casing spaced from the nozzle periphery, and means for drawing the casing away from the nozzle discharge orifice as the same is stuffed with the plastic material.

6. Apparatus as defined in claim 1 wherein said means for sealing said longitudinal edges of the sheet material includes means for applying an adhesive to said one longitudinal edge of the sheet material as it travels between said first flange and said projection.

7. An apparatus as defined in claim 4 wherein said means for sealing the longitudinal edges of the sheet material include means for applying an adhesive to said one longitudinal edge of the sheet material as it travels between said first flange and said projection.

8. An apparatus as defined in claim 5 wherein said adhesive applying means is positioned to engage with said one longitudinal edge of the sheet material as it travels between said first flange and said projection.

References Cited in the file of this patent

UNITED STATES PATENTS

| | | |
|---|---|---|
| 2,006,373 | Vogt | July 2, 1935 |
| 2,686,128 | Conti | Aug. 10, 1954 |
| 2,758,523 | Moncrieff | Aug. 14, 1956 |
| 2,766,568 | Tasker | Oct. 16, 1956 |

UNITED STATES PATENT OFFICE
CERTIFICATE OF CORRECTION

Patent No. 3,066,461                  December 4, 1962

William E. Meissner et al.

It is hereby certified that error appears in the above numbered patent requiring correction and that the said Letters Patent should read as corrected below.

Column 5, line 15, for "stream" read -- steam --; line 36, for "causing" read -- casing --; column 6, lines 55 and 56, for "castings" read -- casings --; column 8, line 69, for "2,006,373' read -- 2,006,375 --.

Signed and sealed this 3rd day of September 1963.

(SEAL)
Attest:

ERNEST W. SWIDER
Attesting Officer

DAVID L. LADD
Commissioner of Patents